US011977961B2

(12) United States Patent
Ergen

(10) Patent No.: US 11,977,961 B2
(45) Date of Patent: May 7, 2024

(54) METHOD AND SYSTEM FOR DISTRIBUTION OF COMPUTATIONAL AND STORAGE CAPACITY USING A PLURALITY OF MOVING NODES IN DIFFERENT LOCALITIES: A NEW DECENTRALIZED EDGE ARCHITECTURE

(71) Applicant: Ambeent Wireless, Istanbul (TR)

(72) Inventor: Mustafa Ergen, Istanbul (TR)

(73) Assignee: Ambeent Wireless, Istanbul (TR)

( * ) Notice: Subject to any disclaimer, the term of this patent is extended or adjusted under 35 U.S.C. 154(b) by 844 days.

(21) Appl. No.: 17/069,784

(22) Filed: Oct. 13, 2020

(65) Prior Publication Data

US 2021/0117860 A1   Apr. 22, 2021

Related U.S. Application Data

(60) Provisional application No. 62/916,256, filed on Oct. 17, 2019.

(51) Int. Cl.
*G06F 9/50* (2006.01)
*G06N 20/00* (2019.01)

(52) U.S. Cl.
CPC .......... *G06N 20/00* (2019.01); *G06F 9/5072* (2013.01); *G06F 9/5077* (2013.01);
(Continued)

(58) Field of Classification Search
CPC .......... G06N 20/00; G06N 3/08; G06N 3/006; G06N 7/01; G06F 9/5072; G06F 9/5077;
(Continued)

(56) References Cited

U.S. PATENT DOCUMENTS 9,374,281 B2 *   6/2016   Dasgupta .............. H04L 47/365
2014/0317315 A1 * 10/2014   Duchesneau ....... H04L 41/0816
                                                              709/250
(Continued)

OTHER PUBLICATIONS

PCT/US2020/055927, "Notification of Transmittal of the International Search Report and the Written Opinion of the International Searching Authority, or the Declaration", dated Jan. 26, 2020, pp. 1-12.

(Continued)

*Primary Examiner* — Chris Parry
*Assistant Examiner* — Hassan A Khan
(74) *Attorney, Agent, or Firm* — CHIP LAW GROUP

(57) ABSTRACT

The invention generally relates to a method and system for distribution of computational capacity for a plurality of end-devices in different localities using a decentralized edge architecture. The method and system clusters a plurality of moving nodes capable of offering highly virtualized computational and storage resources utilizing an Artificial Intelligence (AI) model. The clustering is performed by utilizing two prediction models: a mobility prediction model and a theoretical framework. The mobility prediction model learns timing and direction of movements such as mobility patterns of each of the plurality of moving nodes, as to ascertain computational capacity for the given locale at a certain time. The theoretical framework performs sequential to parallel conversion in learning, optimization and caching algorithms of the AI model under contingent circumstances. Upon clustering, the cluster of moving nodes is utilized to process a plurality of workloads co-operatively for the set of end-devices in the given locale.

38 Claims, 8 Drawing Sheets

(52) U.S. Cl.
CPC ............... *G06F 2209/5019* (2013.01); *G06F 2209/502* (2013.01); *G06F 2209/503* (2013.01); *G06F 2209/505* (2013.01)

(58) Field of Classification Search
CPC ....... G06F 2209/5019; G06F 2209/502; G06F 2209/503; G06F 2209/505
See application file for complete search history.

(56) References Cited

U.S. PATENT DOCUMENTS

| | | | | |
|---|---|---|---|---|
| 2016/0294783 | A1* | 10/2016 | Piqueras Jover | H04W 12/04 |
| 2017/0006135 | A1* | 1/2017 | Siebel | G06Q 10/06 |
| 2017/0006141 | A1* | 1/2017 | Bhadra | H04W 4/70 |
| 2017/0048308 | A1* | 2/2017 | Qaisar | H04L 41/0895 |

OTHER PUBLICATIONS

J. Chen et al., "Deep Learning with Edge Computing: A Review", Proceedings of the IEEE, vol. 107, No. 8, Aug. 2019, pp. 1655-1674.

Z. Zhou et al., "Edge Intelligence: Paving the Last Mile of Artificial Intelligence with Edge Computing", Proceedings of the IEEE, vol. 107, No. 8, Aug. 2019, pp. 1738-1762.

D.N. JHA et al., "IoTSim-Edge: A Simulation Framework for Modeling the Behaviour of IoT and Edge Computing Environments", retrieved on Dec. 21, 2020, retrieved from the Internet URL https://arxiv.org/ftp/arxiv/papers/1910/1910.03026.pdf, pp. 1-19.

* cited by examiner

METHOD AND SYSTEM FOR DISTRIBUTION OF COMPUTATIONAL AND STORAGE CAPACITY USING A PLURALITY OF MOVING NODES IN DIFFERENT LOCALITIES: A NEW DECENTRALIZED EDGE ARCHITECTURE

CROSS-REFERENCE TO RELATED APPLICATION

This application claims priority to U.S. Provisional Application Ser. No. 62/916,256 filed on Oct. 17, 2019, titled "METHOD AND SYSTEM FOR EDGE ON WHEELS IN 6G WITH OMNIBUS NETWORKING", the entire disclosure of which is hereby incorporated herein by reference.

FIELD OF THE INVENTION

The invention generally relates to distribution of computational capacity for a plurality of end-devices in different localities. Specifically, the invention relates to a method and system for distribution of computational capacity for a plurality of end-devices in different localities using a decentralized edge architecture with an Artificial Intelligence (AI) model to enable fast and efficient distribution of computational and storage resources using a plurality of moving nodes which may include, but need not be limited to, moving vehicles, pedestrians carrying wireless and/or cellular communication devices (such as, but not limited to, Wi-Fi, LTE, 5G, 6G) and drones.

BACKGROUND OF THE INVENTION

In recent years, both the scientific community and industry are focusing on moving computational resources from a centralized cloud with remote datacenters, to decentralized computing, closer to a source or a so called "edge" of a network. This is in light of the fact that the cloud system alone cannot efficiently support the future network demands with massive growth of time-critical new applications, such as, but not limited to, self-driving vehicles, augmented reality (AR)/virtual reality (VR) techniques, advanced robotics, and smart, remote critical Internet of Things (IoT) applications. While decentralized edge computing will form the backbone of future heterogeneous networks, it is still in its infancy and there is no comprehensive platform to date.

Also, since there are billions of internet-connected devices around the world including smart phones and computers, a centralized cloud system alone will be insufficient to handle the future networks efficiently, wherein there is an environment of billions of devices equipped with sensors, geared to collect huge amounts of data, drawing inferences to carry out an action. The transfer of massive amounts of data, from the connected devices to the cloud to be analyzed, creates very crowded traffic on the network infrastructure. Moreover, the transfer of data back and forth between the cloud and individual devices increases latency while many new applications such as, but not limited to, self-driving vehicles, remote surgery, AR/VR, 8K video, advanced robotics in manufacturing, and drone surveillance communication, require real-time, ultra-low delay performance.

In view of these challenges, data center operations are being pushed to the "edge" of the network. The edge allows for certain time-critical and security-sensitive Artificial Intelligence (AI) applications to operate either entirely on a device, or in conjunction with localized datacenters. None of the existing edge architectures implemented so far, are sufficient to handle the massive data traffic computing in the future networks. Most of the existing solutions focus on installing edge devices to singular static locations (for example, factories, shopping malls) or around specific geographic areas (urban centers), which bear the cost of additional infrastructure deployments.

There is also a growing body of research on exploiting connectivity among end-devices in close proximity, to process tasks cooperatively in local area computation groups, though these efforts are again limited in scope.

The cloud has been an important solution for companies looking to scale their computational operations without investing in new infrastructure and to cut down on operational costs by transferring their datacenters to cloud providers. While the cloud catalyzed growth and adoption of Big Data, it hides the costs and limitations related to network latency, security, and privacy. As a result, in recent years, discussion on computational operations increasingly moved from the centralized cloud, with remote datacenters, to decentralized computing, closer to the source or the so called "edge" of the network.

Edge solutions allow information processing to take place at the device or gateway level. This reduces the need to transfer data back and forth between the cloud and a datacenter, thereby decreasing latency, bandwidth requirements, and connectivity dependencies. Outside of technical reasons, decentralized computing is energy saving given the power and cooling costs associated with big datacenters. Furthermore, research on edge computing is driven by security and privacy concerns related to the centralized cloud on the part of states, firms and consumers. At the same time, falling prices in compute and storage, together with rise of machine learning, is driving the adoption of edge computing.

Fog computing is an extension of the cloud computing paradigm, from the core to the edge of the network. Hence, unlike Mobile Edge computing (MEC), Fog computing is strongly linked to the cloud, unable to operate in a stand-alone mode. As a result, there has been a special focus on communication between the Fog and the cloud. Moreover, unlike MEC, which is generally deployed at a base station, Fog nodes can be placed anywhere with a network connection, such as, for example, on a factory floor, top of a power pole, a railway track, or a vehicle.

Most of the proposed applications bear the cost of additional infrastructure deployment, whether it is installing edge devices to singular static locations (for example, factories, shopping malls) or around specific geographic areas (urban centers). Furthermore, scalability is affected negatively with the massive increase of people performing transactions within a given specific edge domain. As a huge number of users require computing and storage transactions on the network, computations are expected to become much faster allowing for the rise of a truly global network.

There is a growing body of work focusing on exploiting connectivity among end-devices, in particular, mobile devices (mobile cloud computing) in close proximity, to process tasks cooperatively in local area computation groups. The end-devices in a given area communicate with each other to find resources and deliver requests. Hence, the end-user stratum and the edge stratum are merged. In the literature, collaboration is a central feature. For instance, there are solutions where mobile devices form "mobile clouds", or mClouds to accomplish tasks locally, and a collaborative computing platform was proposed, where nearby devices form an ad-hoc network and provide various capabilities as cloud services. A resource sharing mechanism was also proposed to utilize capable mobile devices through opportunistic contacts between them. Furthermore, there are solutions which focused on Virtual Machine (VM) technology to harness the full power of local hardware at the edges of the Internet, while other solutions utilized an adaptive method of resource discovery and address service provisioning in opportunistic computing environments for managing higher load requests without causing instability.

An architecture called Vehicular Fog Computing (VFC) for vehicular applications was also proposed. This preliminary work refers to vehicles (both moving and parked) as an infrastructure for communication and computation, however, it services vehicles alone without servicing all other connected devices and applications. In all proposals regarding edge computing that merge the end-user stratum and the edge stratum, devices share their resources among each other in a limited area.

Thus, there exists a need for a method and system to bring together a whole range of technologies for decentralized computing despite the aforesaid challenges, together with scalability and adaptability.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
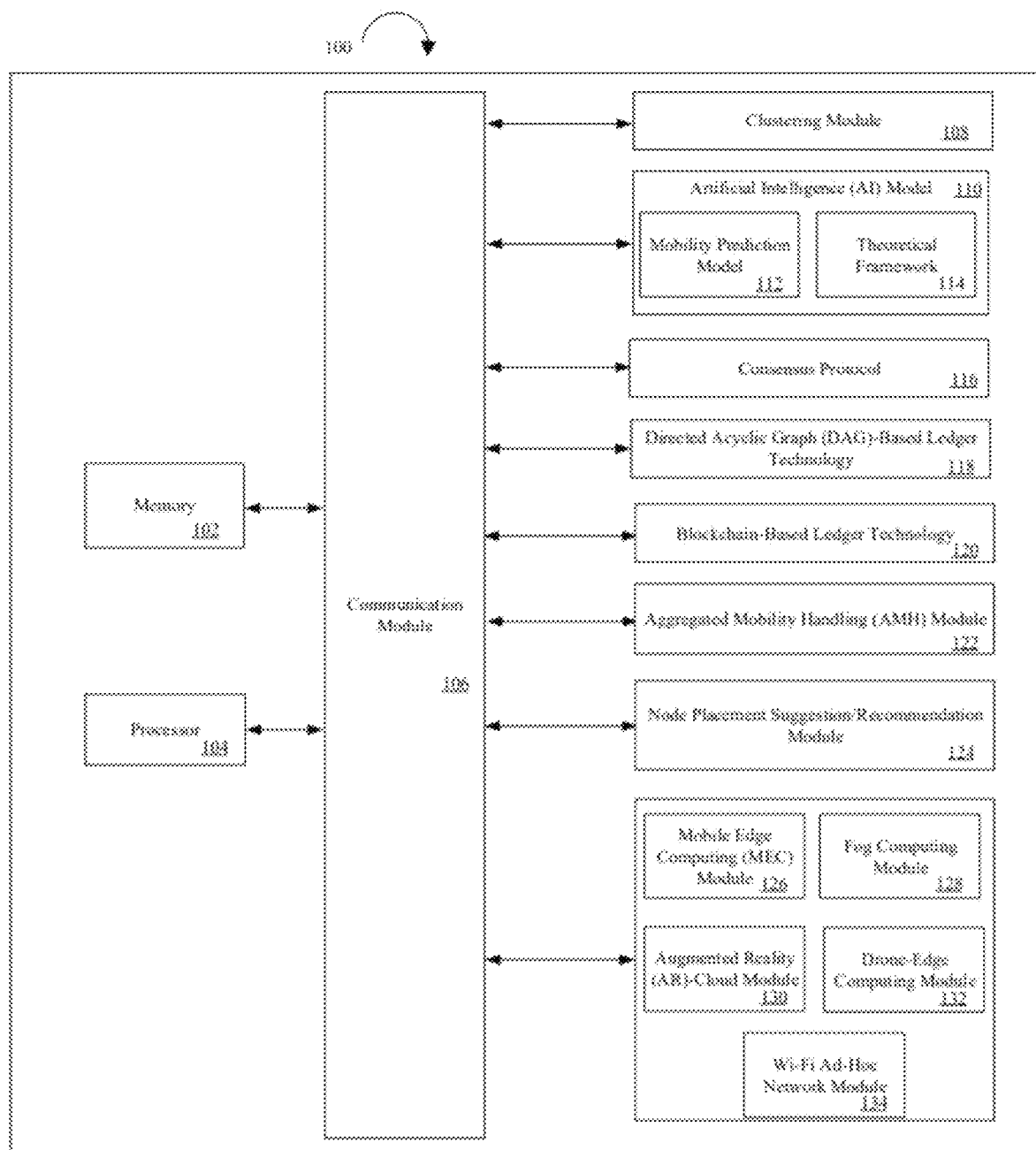
FIG. 1 illustrates a system for distribution of computational capacity for a plurality of end-devices in different localities using a decentralized edge architecture in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the invention, it should be observed that the embodiments reside primarily in combinations of method steps and system components for distribution of computational capacity for a plurality of end-devices in different localities using a decentralized edge architecture with an Artificial Intelligence (AI) model to enable fast and efficient distribution of computational and storage resources using a plurality of moving nodes which may include, but need not be limited to, moving vehicles, pedestrians carrying wireless and/or cellular communication devices (such as, but not limited to, Wi-Fi, LTE, 5G, 6G) and drones.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Various embodiments of the invention disclose a method and system for distribution of computational capacity for a plurality of end-devices in different localities using a decentralized edge architecture. To start with, the method and system clusters a plurality of moving nodes which are capable of offering highly virtualized computational and storage resources utilizing an AI model. The plurality of moving nodes may include, but need not be limited to, moving vehicles, pedestrians carrying wireless and/or cellular communication devices (such as, but not limited to, Wi-Fi, LTE, 5G, 6G) and drones. The cluster of moving nodes thus created provides a local hub for a set of end-devices of the plurality of end-devices in close proximity to each other in a given locale. The method and system performs the clustering by utilizing two prediction models in the AI model: a mobility prediction model and a theoretical framework. The mobility prediction model learns timing and direction of movements such as, but not limited to, mobility patterns of each of the plurality of moving nodes, as to ascertain computational capacity for the given locale at a certain time. The theoretical framework performs sequential to parallel conversion in learning, optimization and caching algorithms of the AI model under contingent circumstances. Upon clustering, the cluster of moving nodes is utilized to process a plurality of workloads co-operatively for the set of end-devices in the given locale.

In accordance with an embodiment of the invention, the method and system performs clustering of the plurality of moving nodes by employing a consensus protocol to ensure consensus among a cluster of moving nodes of the plurality of moving nodes working towards a common goal. The consensus protocol is used to understand capabilities of a variety of moving nodes using different service providers. In the event that one or more moving nodes of the cluster of moving nodes are disabled, the plurality of workloads are redistributed among the other moving nodes in the cluster and the one or more disabled moving nodes are enabled to leave the cluster by restoring the system without restarting it. The AI model further employs *Byzantine* Fault Tolerance for scenarios where a moving node's data center may fail or move. The AI model applies model parallelism by partitioning the AI model itself to distribute the plurality of workloads to the other moving nodes.

Furthermore, the AI model defines missing intermediate moving nodes and provides placement suggestions/recommendations to position the plurality of moving nodes at specific locations to ensure connectivity of new edges/paths due to the missing intermediate moving nodes.

In accordance with another embodiment of the invention, the method and system distributes storage systems to enable faster I/O and non-blocking data processing procedures for a plurality of different environments. The plurality of different environments may include, but need not be limited to, one or more of a single node local disk and distributed file systems.

In accordance with yet another embodiment of the invention, the AI model employs distributed Machine Learning (ML) and model parallelism to speed up large-scale ML by reducing training time, by means of parallel or distributed computing. The AI model employs simple programming models that allow for the distributed processing of large datasets across clusters of computers by building parallel systems harnessing thousands of simple and efficient computing and storage resources.

In accordance with yet another embodiment of the invention, the AI model employs a next generation distributed Directed Acyclic Graph (DAG)-based ledger technology for high frequency transactions to create a peer-to-peer network protocol. In order to ensure a continuous system, high frequency and low frequency transactions are optimized by harmonizing DAG-based ledger technology and Blockchain-based ledger technology.

In accordance with yet another embodiment of the invention, the AI model performs Aggregated Mobility Handling (AMH) by charting out mobility patterns of the plurality of moving nodes to optimize the computing and storage distribution among the plurality of moving nodes. The AMH is performed over a combination of DAG-based ledger technology and Blockchain-based ledger technology, depending on different frequency scenarios.

In accordance with yet another embodiment of the invention, the AI model utilizes a convex optimization method which relies on accurate traffic flow sensing to predict flow/movement of the plurality of moving nodes to represent coordination of the plurality of moving nodes.

In accordance with yet another embodiment of the invention, the AI model utilizes generic reinforcement learning techniques for improved dimension reduction and applies ML and optimization methods to mixed autonomy systems. Further, the AI model performs real-time independent decision-making by utilizing a sequential decision-making tool/program, to model the learning and decision-making processes of users, passengers and/or drivers of the plurality of moving nodes. The AI model also utilizes a decentralized, learning-based solution using deep reinforcement learning, to analyze interactions between humans, the plurality of moving nodes and a sensing infrastructure, to provide insights related to behavior of each moving node of the plurality of moving nodes. The insights are replicated, shared, and synchronized among the plurality of moving nodes, over a distributed ledger technology, through peer-to-peer ad-hoc networking.

In accordance with yet another embodiment of the invention, the method and system leverages and combines mesh networking systems for performing node-to-node and node-to-device communication and creates and employs a global mobility map to understand mobility patterns of the plurality of moving nodes.

In accordance with yet other embodiment of the invention, the decentralized edge architecture is further integrated with one or more of edge-centric Mobile Edge computing (MEC), Fog computing, Augmented Reality (AR)-cloud, Drone-edge computing, and a long-range Wi-Fi ad-hoc network.

The AR-cloud includes a digital content layer mapped to objects and locations in a real physical world to enable an ubiquitous, scalable, spatial user experience. The AR-cloud creates a digital copy (Digital Twin) of the real physical world and associates the information added to the digital copy with the relevant physical spaces and objects in the real physical world.

Drone-edge computing enables unmanned aerial vehicles to serve as additional distributed storage and computation resources, along with pedestrians and a plurality of moving vehicles, thereby supporting the continuous distribution of computational capacity for the plurality of end-devices in different localities.

The long-range Wi-Fi ad-hoc network is integrated with unidirectional antennas, satellite antennas or a ground station. The Wi-Fi ad-hoc network acts as a backbone ad-hoc network that can connect different local regions without Internet.

FIG. 1 illustrates a system 100 for distribution of computational capacity for a plurality of end-devices in different localities using a decentralized edge architecture in accordance with an embodiment of the invention.

System 100, which consists of several modules, can be launched as a mobile application on any computing device, such as, but not limited to, a smart phone, a tablet, or a mobile device. The plurality of end-devices are client devices such as, but not limited to, mobile devices, smart phones, hand-held computing devices, laptops, or tablets.

As illustrated in FIG. 1, system 100 comprises a memory 102 and a processor 104 communicatively coupled to memory 102. Memory 102 and processor 104 further communicate with various modules of system 100 via a communication module 106.

Communication module 106 may be configured to transmit data between modules, engines, databases, memories, and other components of system 100 for use in performing the functions discussed herein. Communication module 106 may include one or more communication types and utilizes various communication methods for communication within system 100.

In an embodiment, system 100 further comprises distributed storage systems to enable faster I/O and non-blocking data processing procedures for a plurality of different environments. The plurality of different environments may include, but need not be limited to, one or more of a single node local disk and distributed file systems.

Various internal components of system 100 to provide functions discussed herein are described in detail as follows.

System 100 includes a clustering module 108 for clustering a plurality of moving nodes which are capable of offering highly virtualized computational and storage resources using an AI model 110. The plurality of moving nodes may include, but need not be limited to, moving vehicles, pedestrians carrying wireless and/or cellular communication devices (such as, but not limited to, Wi-Fi, LTE, 5G, 6G) and drones. The cluster of moving nodes thus created provides a local hub for a set of end-devices of the plurality of end-devices in close proximity to each other in a given locale.

To perform clustering, AI model 110 includes two prediction models: a mobility prediction model 112 and a theoretical framework 114. Mobility prediction model 112 learns timing and direction of movements such as, but not limited to, mobility patterns of each of the plurality of moving nodes as to ascertain the flow of individual moving nodes of the plurality of moving nodes in a given area at a certain time and computational capacity for the given locale at a certain time.

Theoretical framework 114 performs sequential to parallel conversion in learning, optimization and caching algorithms of AI model 110 under contingent circumstances for efficient distribution of computing and storage resources among the plurality of moving nodes and minimizes the networking overheads as the plurality of moving nodes move in and out of the given area or region.

In accordance with an embodiment, the clustering is performed by AI model 110 by employing a consensus protocol 116 to ensure consensus among a cluster of moving nodes of the plurality of moving nodes working towards a common goal. Consensus protocol 116 is used to understand capabilities of a variety of moving nodes using different service providers. Various other modules of AI model 110 are further described in detail in conjunction with FIG. 2.

AI model 110 also employs a next generation distributed Directed Acyclic Graph (DAG)-based ledger technology 118 for high frequency transactions to create a peer-to-peer network protocol due to scalability potential and lesser processing power requirements of DAG-based ledger technology 118. In order to ensure a continuous system, the high frequency and low frequency transactions are optimized by harmonizing DAG-based ledger technology 118 and a Blockchain-based ledger technology 120.

AI model 110 further performs Aggregated Mobility Handling (AMH) of the plurality of moving nodes using an AMH module 122 by charting out mobility patterns of the plurality of moving nodes, in order to optimize the computing and storage distribution among the plurality of moving nodes. AMH module 122 is performed over a combination of DAG-based ledger technology 118 and Blockchain-based ledger technology 120, depending on different frequency scenarios. AMH module 122 also leverages AI model 110 to solve the massive routing problem, to bring Internet data to unconnected regions and combines mesh networking systems for performing node-to-node and node-to-device communication, and creates and employs a global mobility map to understand mobility patterns of the plurality of moving nodes.

Upon clustering, the cluster of moving nodes is utilized to process a plurality of workloads co-operatively for the set of end-devices in the given locale. In an event that one or more moving nodes of the cluster of moving nodes is disabled, AI model 110 redistributes the plurality of workloads among the other moving nodes in the cluster and enables the one or more disabled moving nodes to leave the cluster by restoring system 100 without restarting it.

Further, AI model 110 employs *Byzantine* Fault Tolerance for scenarios where a moving node's data center may fail or move. AI model 110 also applies model parallelism by partitioning AI model 110 itself to distribute the plurality of workloads to the other moving nodes.

In accordance with an embodiment, AI model 110 defines missing intermediate moving nodes and provides placement suggestions/recommendations to position the plurality of moving nodes at specific locations to ensure connectivity of new edges/paths due to the missing intermediate moving nodes, using a node placement suggestion/recommendation module 124 of system 100.

In accordance with another embodiment, the decentralized edge architecture of system 100 is further integrated with one or more of edge-centric Mobile Edge computing (MEC) module 126, Fog computing module 128, Augmented Reality (AR)-cloud module 130, Drone-edge computing module 132, and a Wi-Fi ad-hoc network module 134.

MEC module 126 processes information at a device or a gateway level to reduce the need to transfer data back and forth between the cloud and a datacenter and decreases latency, bandwidth requirements, and connectivity dependencies. MEC module 126 is also driven by security and privacy concerns related to the centralized cloud on the part of states, firms and consumers. Further, the reduction of prices in compute and storage, together with the rise of machine learning, is driving the adoption of MEC module 126.

Fog computing module 128 is an extension of the cloud computing paradigm, from the core to the edge of the network. Fog computing module 128 is strongly linked to the cloud, and unable to operate in a standalone mode. As a result, there has been a special focus on communication between the Fog and the cloud. Unlike MEC module 126, which is generally deployed at a base station, Fog nodes can be placed anywhere with a network connection, for example, on a factory floor, a top of a power pole, a railway track, or a vehicle.

AR-cloud module 130 connects with an AR-cloud which includes a digital content layer mapped to objects and locations in a real physical world to enable an ubiquitous, a scalable, and a spatial user experience. In order to map the digital content layer with objects and location in the real physical world, AR-cloud module 130 creates a digital copy (Digital Twin) of the real physical world and associates the information added to the digital copy with the relevant physical spaces and objects in the real physical world.

Drone-edge computing module 132 enables unmanned aerial vehicles to serve as additional distributed storage and computation resources, along with pedestrians and a plurality of moving vehicles, thereby supporting the continuous distribution of computational capacity for the plurality of end-devices in different localities.

Wi-Fi ad-hoc network module 134 connects with a long-range Wi-Fi ad-hoc network which is integrated with uni-directional antennas, satellite antennas or a ground station. The Wi-Fi ad-hoc network acts as a backbone ad-hoc network that can connect different local regions without Internet.

Figure 2:
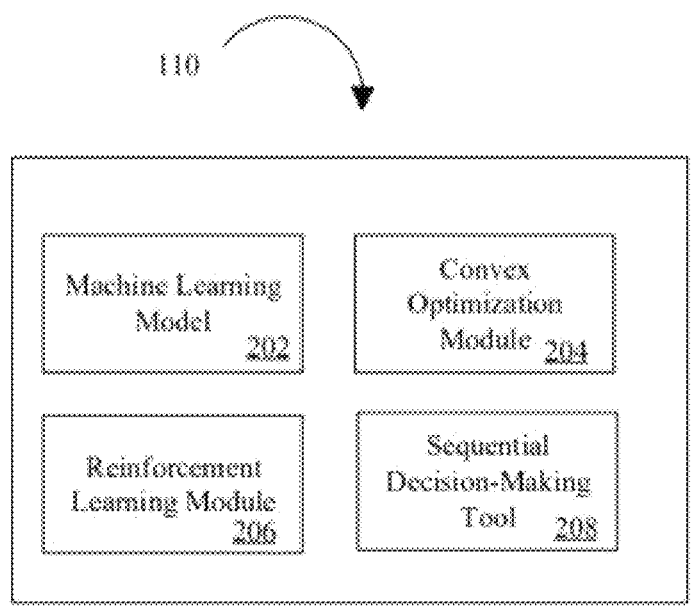
FIG. 2 illustrates various modules of an Artificial Intelligence (AI) model for efficient distribution of computing and storage resources among the plurality of moving nodes in accordance with an embodiment of the invention.

FIG. 2 illustrates various modules of AI model 110 for efficient distribution of computing and storage resources among the plurality of moving nodes in accordance with an embodiment of the invention.

AI model 110 includes a distributed machine learning (ML) model 202 and model parallelism to speed up large-scale ML by reducing training time, by means of parallel or distributed computing. AI model 110 employs simple programming models that allow for the distributed processing of large datasets across clusters of computers by building parallel systems harnessing thousands of simple and efficient computing and storage resources. Thus, the tasks are implemented speculatively and in an out of order manner, and thousands of tasks are speculated efficiently prior to the earliest active task in order to reveal sufficient parallelism.

AI model 110 further includes a convex optimization module 204 to solve various mobility handling problems by predicting flow/movement of the plurality of moving nodes to represent coordination of the plurality of moving nodes. Convex optimization module 204 relies on accurate traffic flow sensing and allows a Mobility as a Service (MaaS) application to enable user induced non-autonomy systems to turn a generally assumed to be intractable problem into a mixed-autonomy problem.

Further, the mobility handling problems are first generalized using a generic reinforcement learning module 206 for improved dimension reduction, and ML and optimization methods are applied to mixed autonomy systems. Reinforcement learning module 206 is also used to explore empirical and theoretical justifications of edge/caching systems and their optimization methods as a design paradigm.

AI model 110 further performs real-time independent decision-making by utilizing a sequential decision-making tool/program 208 to model the learning and decision-making processes of users, passengers and/or drivers of the plurality of moving nodes. As commuters make repeated decisions, the commuters learn over time to optimize their route choices. The decisions made by the commuters are efficiently modeled by a sequential process, where the commuters optimize a payoff function at each step, linked to the results experienced by the commuters.

In order to address complex traffic problems, AI model 110 utilizes a decentralized, learning-based solution using deep reinforcement learning, to analyze interactions between humans, the plurality of moving nodes and a sensing infrastructure, to provide insights related to behavior of each moving node of the plurality of moving nodes. The insights are replicated, shared, and synchronized among the plurality of moving nodes, over a distributed ledger technology through peer-to-peer ad-hoc networking, to understand the potential for automation of flow.

Figure 3:
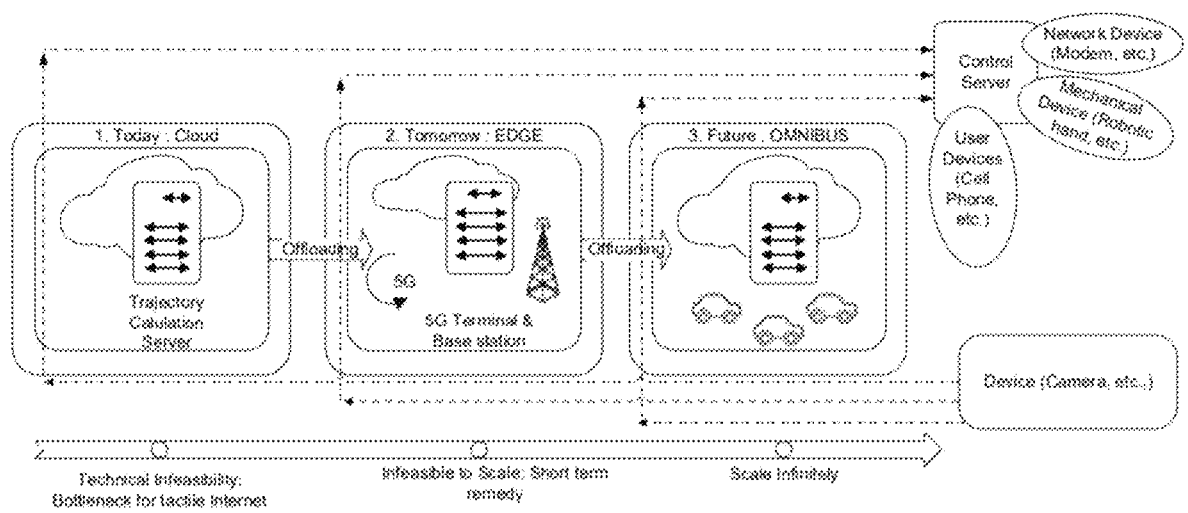
FIG. 3 illustrates a general concept of a mobile edge architecture for decentralized computing and storage of resources in accordance with an exemplary embodiment of the invention.

FIG. 3 illustrates a general concept of a mobile edge architecture for decentralized computing and storage of resources in accordance with an exemplary embodiment of the invention.

The mobile edge architecture is implemented as OMNIBUS solution to enhance the decentralized computing and storage architecture using vehicles. In this case, road vehicles emerge as the most promising candidate for future distributed datacenters on the edge of the network for two primary reasons. Firstly, most of the road vehicles display predictable movement patterns. Secondly, the hardware capabilities for storage and computation in the road vehicles are expected to advance tremendously in the coming years. In the mobile edge architecture, the plurality of road vehicles are clustered to form a powerful local hub in individual areas which are capable of offering high computational virtualized resources for end-devices.

The mobile edge architecture or OMNIBUS solution utilizes mobility prediction model 112 to determine the flow of individual vehicles in a given area at a certain time. Based on the flow of individual vehicles, a local hub is created for end-devices in that area by using vehicles as building blocks. Subsequently, efficient algorithms are developed to ensure computing and storage workloads for individual areas, as vehicles move in and out of a given area. Further, in order to minimize networking overheads as vehicles move in and out of a region, it is necessary to analyze a required distribution of computing and storage resources among vehicles. Based on the requirement, the mobile edge architecture initiates theoretical framework 114 included in AI model 110 for performing sequential to parallel conversion in learning, optimization, and caching algorithms under unreliable circumstances for time critical performance. Thus, the future of edge computing is made scalable, and ultra-low latency networking is feasible for the time critical applications at a flat cost and energy efficient.

Moving on, the mobile edge architecture or OMNIBUS solution expands the idea of end user stratum and the edge stratum to the next level by introducing a predictive platform for mobility patterns and for the distribution of storage and computation capacity among vehicles, it paves the way for an efficient and highly scalable architecture for device-level edge computing.

Figure 4:
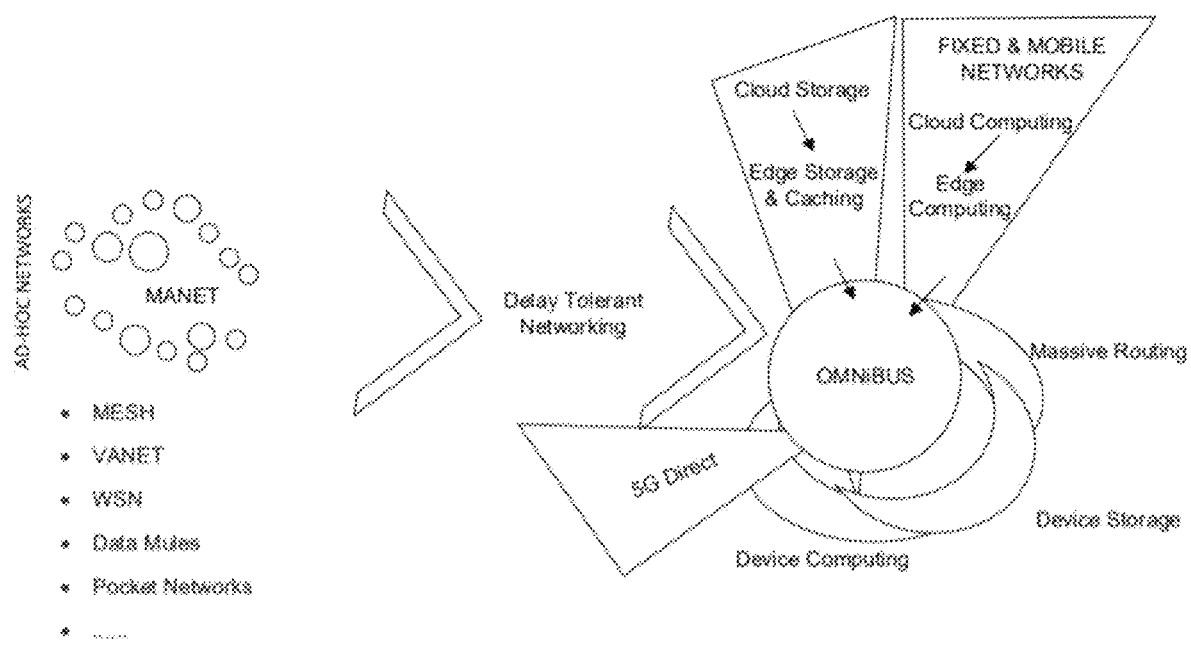
FIG. 4 illustrates a structure of the mobile edge architecture employed with a distributed machine learning model for decentralized computing and storage of resources in accordance with an exemplary embodiment of the invention.

FIG. 4 illustrates a structure of the mobile edge architecture employed with distributed ML model 202 for decentralized computing and storage of resources in accordance with an exemplary embodiment of the invention.

Distributed ML model 202 and model parallelism are employed to increase the speed of large-scale ML by reducing training time, by means of parallel or distributed computing. The methods used for increasing the speed of large-scale ML are data parallelism and model parallelism. Data parallelism partitions the data, and in case of model parallelism, the solution partitions ML model 202 itself to distribute the workload to multiple computational workers. In the mobile edge architecture, it is necessary to understand ways to partition ML model 202 according to heterogeneity and mobility of vehicles as well as with an eye to ensure interoperability on the level of different service providers. For instance, in case of high number of ML models, with each model having its own characteristics and representations, there is no principle way to implement model parallelism.

In distributed ML model 202, the synchronization overhead increases as the system scales. ML software methods are also leveraged to optimize the hyper-parameters of selected algorithms. Furthermore, distributed ML model 202 utilizes Hadoop frameworks, including Hadoop Distributed File System (HDFS), Spark, and Cassandra for faster and energy efficient computation as illustrated in FIG. 5.

Figure 5:
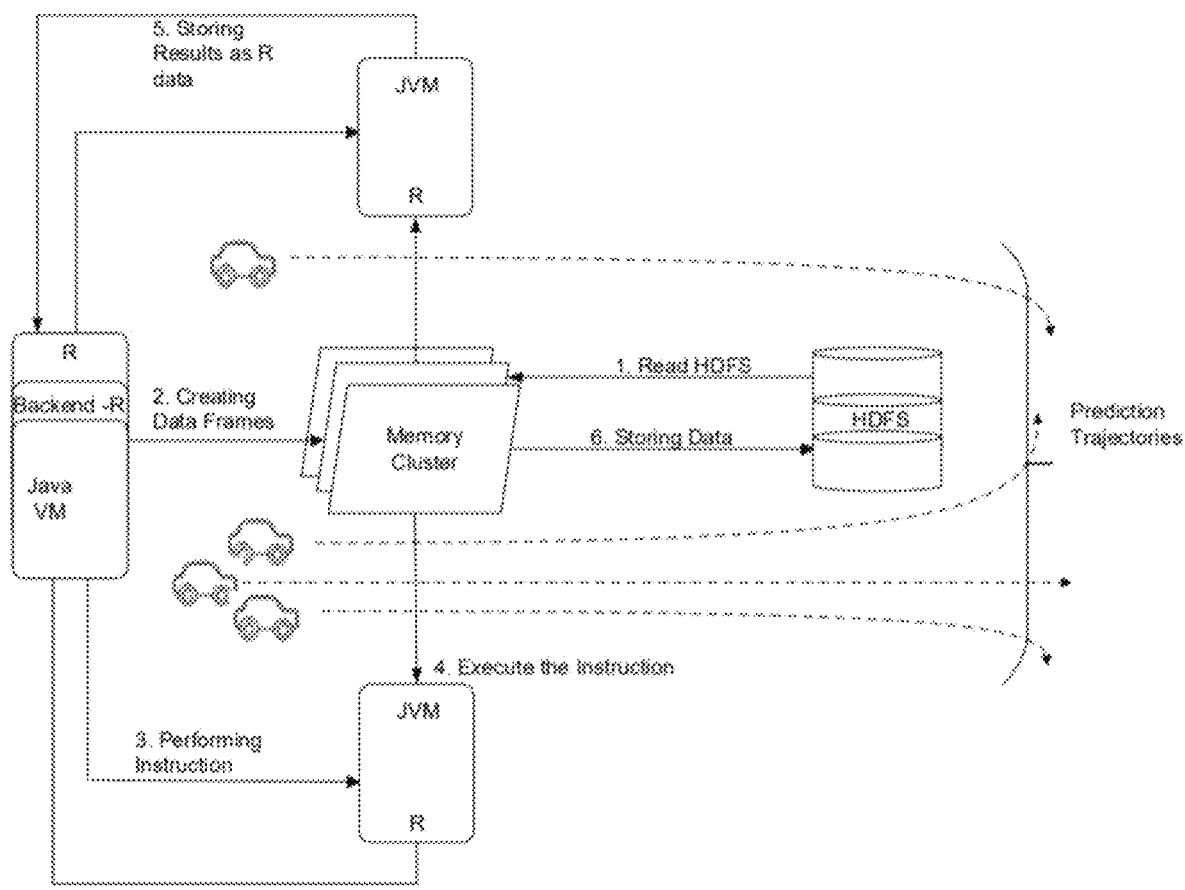
FIG. 5 illustrates a demonstration of machine learning software programming with Hadoop Distributed File System (HDFS) distributed over vehicles in accordance with an embodiment of the invention.

FIG. 5 illustrates the distribution of ML model 202 with the HDFS over moving vehicles for faster and energy efficient computation in accordance with an embodiment of the invention.

As illustrated in FIG. 5, the Hadoop framework employs simple programming models that allow for the distributed processing of large data sets across clusters of computers. Spark is a compute engine for Hadoop data that supports an entire range of applications such as, but not limited to, machine learning, stream processing, and the like. Cassandra is a highly scalable database with no single point of failure, which makes it ideal for mission critical data.

In accordance with an exemplary embodiment of the invention, next generation distributed ledger technology is employed. For storing data and enabling fast computation in the network, it is important to study DAG-based ledger technology 118. DAG may be the primary data structure to create a peer-to-peer network protocol. In distributed ML methods, DAG enables to add cognitive capabilities as well as consensus mechanisms. DAG is largely more suitable due to its scalability potential and lesser processing power requirements compared to Bitcoin-like Blockchain-based ledger technologies.

In Blockchain-based ledger technology 120, the block size and the time required to generate a new block puts limitations on throughput and transaction times. In contrast to Blockchain-based ledger technology 120, DAG transactions are not grouped into blocks. Each new transaction confirms at least one previous transaction and transactions are represented as "units." Hence, selection of a branch and detection of double-transaction is decoupled from transaction verification, which allows nodes to verify transactions in parallel. As a result, DAG has the potential to achieve unlimited scalability. However, as DAG based solutions emerge for high frequency transaction scenarios, problems may arise in low frequency transactions. When an old transaction is not able to receive enough new transactions to verify, the old transaction may not be confirmed in time or not be confirmed at all. To ensure a continuous system, high frequency and low frequency transactions are optimized by harmonizing DAG and Blockchain concepts as required.

Furthermore, mobility models are used, wherein mobility data contains the approximate whereabouts of individuals and is used to explore the movement patterns of individuals across space and time. Mobility data is among the most sensitive data currently being collected. While the discussion on individual privacy with respect to mobility data is on the rise, the mobile edge architecture or OMNIBUS solution is proposed to design a targeted mobility model by addressing specific tasks that do not compromise an individual's privacy. In doing this, leveraging machine learning software methods and distributed ledger technologies is very important.

Figure 6:
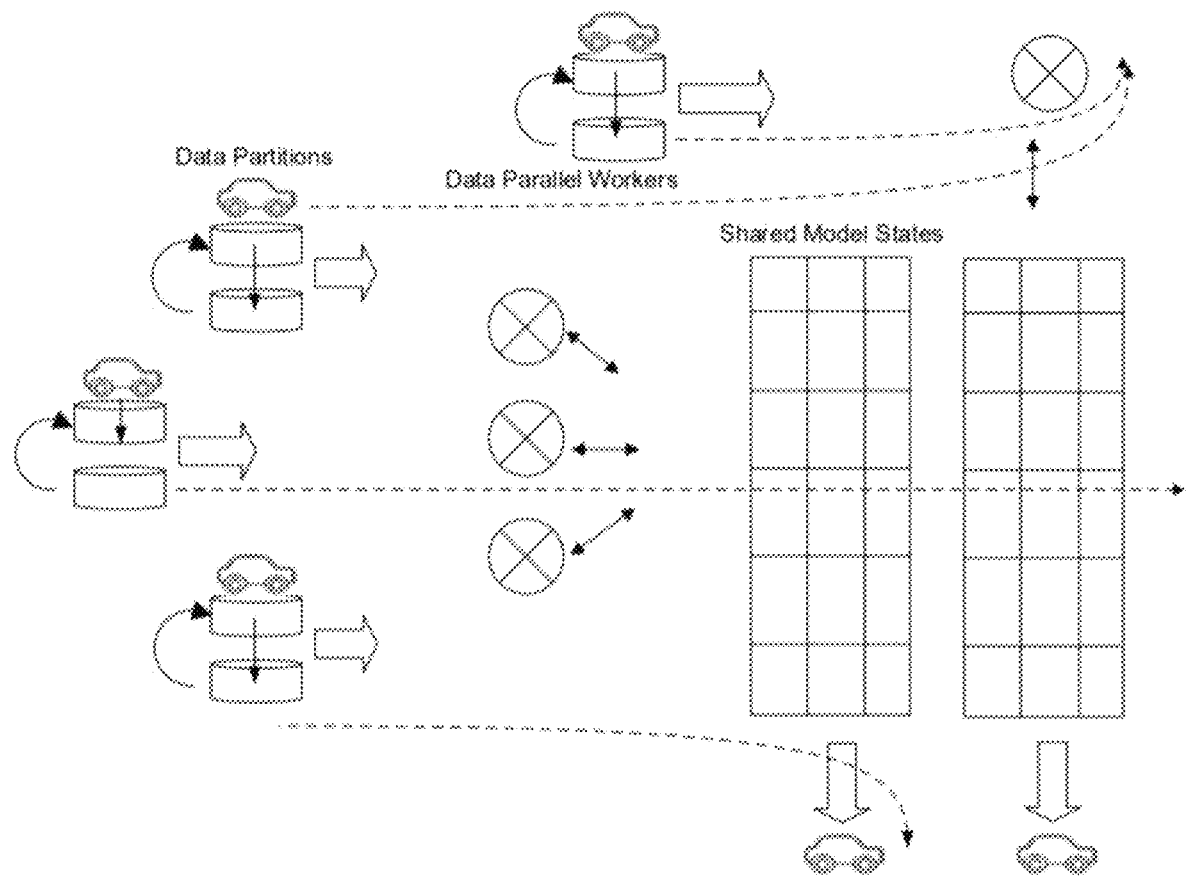
FIG. 6 illustrates an example of distributed machine learning in accordance with an embodiment of the invention.

FIG. 6 illustrates an exemplary use of distributed ML model 202 of AI model 110 in accordance with an embodiment of the invention.

As illustrated in FIG. 6, AMH module 122 is utilized to accurately depict vehicular behavior and it focuses on the following principles: (i) charting out mobility patterns of moving vehicles, in order to optimize the computing and storage distribution among them. Mobility patterns are learned in mixed autonomy with each vehicle sharing the mobility patterns and movements of the other vehicles. (ii) Aggregating DAG-based ledger technology 118 and Blockchain-based (distributed) ledger technology 120 depending on different frequency scenarios. (iii) Leveraging AI model 110 to solve the massive routing problem, to bring Internet data to unconnected regions.

In order to solve the mobility handling problems, self-driving vehicles, ride sharing, and similar exercises in MaaS are turning transportation into mixed autonomy systems by integrating AWL technology. By reducing randomness, mixed autonomy systems, including autonomous and non-autonomous vehicles, make it possible to accurately depict vehicular behavior (the mobility handling problem). In this relation, mobility pattern challenges and requirements of mixed autonomy systems are observed. More specifically, convex optimization method of convex optimization module 204 predicts the flow in order to represent coordination of automated vehicles, which relies on accurate traffic flow sensing. MaaS applications enable user induced non-autonomy systems to turn a generally assumed to be intractable problem into a mixed-autonomy problem.

In the context of a larger dynamical system, convex optimization module 204 dictates the progression of the integration or the use of automation. The mobility handling problem is first generalized using generic reinforcement learning techniques for improved dimension reduction. Further, ML and optimization methods are applied to mixed autonomy systems, to address the automation problems of integration into existing systems. Empirical and theoretical justifications of edge/caching systems and their optimization methods are also explored as a design paradigm. Through principled learning and optimization methods, even a small number of vehicles can be harnessed for significant impact on the Internet.

At this point, real-time independent decision making for the random behavior of vehicle passengers and drivers is a crucial factor. For this reason, sequential decision-making tool/program 208 is created to model the learning and decision-making processes of vehicle passengers and/or drivers. As commuters make repeated decisions, they learn over time to optimize their route choices. This can be efficiently modeled by a sequential process where they optimize a payoff function at each step, linked to the results they experience.

Sequential decision-making tool/program 208 also leverages existing traffic systems that can often be modeled using complex (nonlinear and coupled) dynamical systems. In addressing complex traffic control problems, a decentralized, learning-based solution involving interactions of humans, automated vehicles, and sensing infrastructure is developed using deep reinforcement learning. The resulting control laws and emergent behaviors of vehicles will potentially provide insight for the behavior of each vehicle. These insights will be replicated, shared, and synchronized among vehicles, over a distributed ledger technology, through peer-to-peer ad-hoc networking to understand the potential for automation of flow.

The novel computational framework that integrates open source deep learning and simulation tools can support the development of edge computing in vehicles, in the context of complex nonlinear dynamics of transportation. Learned policies, resulting from effectively leveraging the structure of human driving behavior, surpass the performance of state-of-the-art predictors designed for various mobile applications. The framework will initially focus on highway traffic, and later include arterial traffic, transit as well as other modes of transportation/commuting (such as, but not limited to, biking, MaaS, carpooling).

In accordance with an embodiment, system 100 utilizes a distributed ledger as a database, where DAG is used in distributed ledger technologies for storing data to enable fast and scalable computation in the network. DAG may be the primary data structure for the OMNIBUS solution to create a peer-to-peer network protocol. However, as DAG-based solutions emerge for high-frequency traffic scenarios, problems may arise in low frequency. To ensure a continuous hybrid system, utilizing sequential Blockchain verification to parallel DAG verification mechanism is necessary to accommodate increasing and unreliable penetration.

Furthermore, the massive routing problem is solved using the mobility patterns, which is crucially important in the context of providing network access to areas without Internet, by adding a spatial component to the temporal sequential process, which may be termed as "Cartesian" machine learning. In doing so, understanding the "next move" to be utilized as the "next hop" in routing purposes is essential. The techniques developed in this regard leverage known models, such as, but not limited to, the replicator dynamics, mirror descent, stochastic gradient descent, and the hedge algorithm. Overall, it is necessary to achieve convergence of all these processes towards a set of equilibria based on assumptions made on the learning process used by humans in decision-making, taking into consideration constraints imposed by transportation.

System 100 further performs decentralized computing and storage, where anticipating the demand for each edge vehicle and deploying adequate vehicle resources are very important to sufficiently meet locational demands. For instance, when a single vehicle moves out of the local area, the vehicle's storage and computing resources are distributed across the vehicles that remain in that area and new vehicles that enter the area. Thus, the method of developing predictive algorithms is necessary to optimally distribute computing and storage resources among vehicles, taking into account challenges related to redundancy, security, heterogeneity of devices, and federation (that interoperability is ensured on the level of different service providers). In developing these algorithms, creating and employing a global mobility map is a key element. Leveraging and combining existing mesh networking systems for vehicle-to-vehicle, vehicle-to-device communication is also necessary. In addition, the method of analyzing how to distribute computing and storage across the entire system, that is, whether data should remain local (shared among vehicles) or be sent to the cloud, would be equally important.

Figure 7:
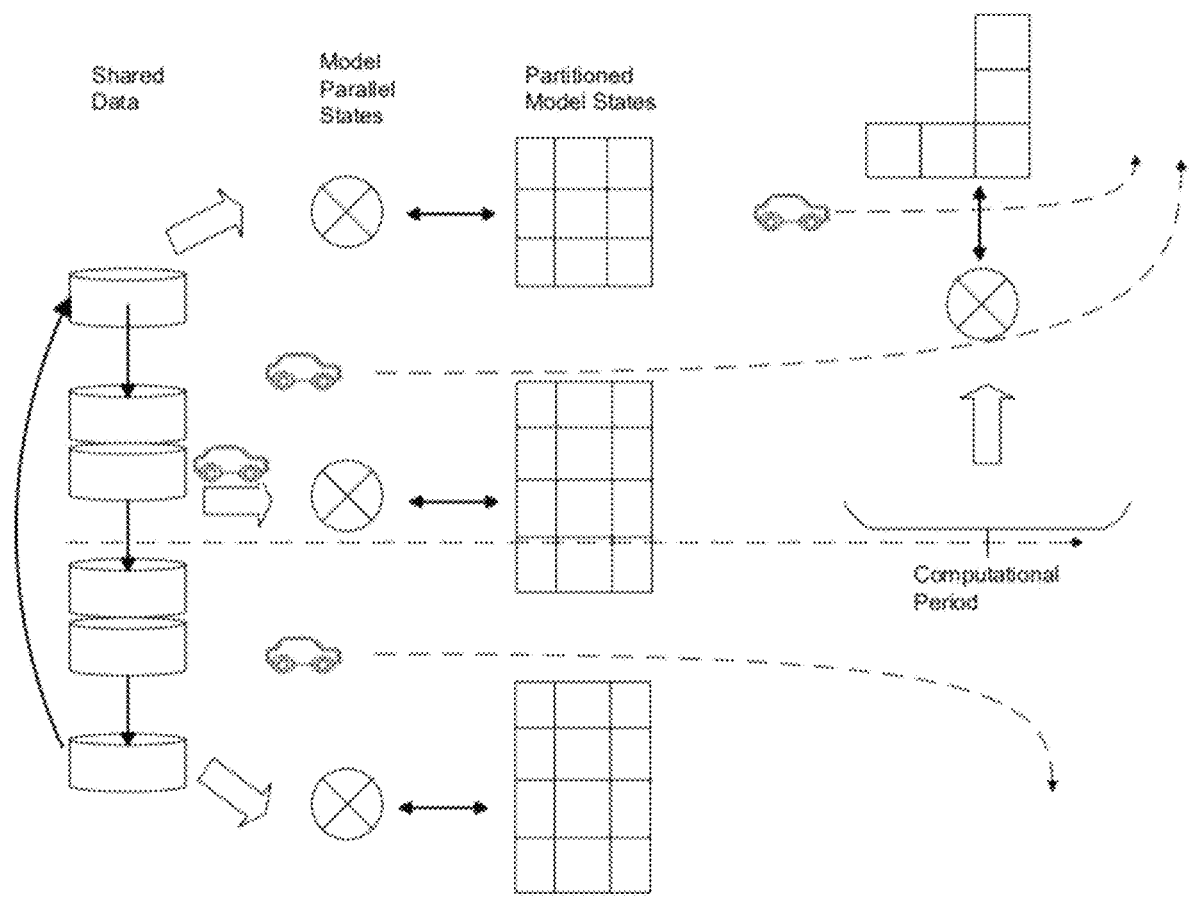
FIG. 7 illustrates an example of a distributed storage in accordance with an embodiment of the invention.

FIG. 7 illustrates an example of a distributed storage in accordance with an embodiment of the invention.

As illustrated in FIG. 7, parallel systems are built that harness thousands of simple and efficient computing and storage resources which is a practical solution to sustain growth without scaling technology. To this end, the mobile edge architecture parallelizes algorithms, and the tasks are implemented speculatively, and in an out of order manner. Moreover, thousands of tasks need to be speculated efficiently prior to the earliest active task in order to reveal sufficient parallelism. To develop parallel algorithms and uncover an abundant parallelism in large-scale applications, new techniques are developed to exploit locality and nested parallelism. In order to generate parallel algorithms in vehicles, system 100 focuses on the following:

(i) System 100 ensures consensus among multiple vehicles working towards a common goal, for instance, when all vehicles involved are solving one optimization problem together, yet with different partitions of the dataset.

(ii) System 100 performs redistribution in the emergency of one of the vehicles being disabled and leaving the cluster and restores the system without restarting it.

(iii) Further, system 100 utilizes communication and management of resources. In case of communication, computation requires a lot of input/output (I/O) (e.g. disk read and write) and data processing procedures. OMNIBUS solution distributes storage systems to enable faster I/O and non-blocking data processing procedures for different types of environments (for example, single node local disk, distributed file systems and the like). In case of managing resources, the issue is one of the managing resources within a given cluster of vehicles to meet all demands while maximizing capacity.

(iv) System 100 designs a programming model to improve efficiency. A new programming model is employed to achieve distributed computing and storage algorithms, in the same way as non-distributed ones, which requires less coding and improves efficiency. Analyzing programming in a single-node fashion, while automatically amplifying the program with distributed computing techniques, is also necessary. Applying model parallelism partitioning to ML model 202 itself, to distribute the workload to multiple computational vehicles is also very important as well as developing a unique data analytics engine specifically targeting the vehicle to vehicle, and vehicle to connected device, for big data processing.

Figure 8:
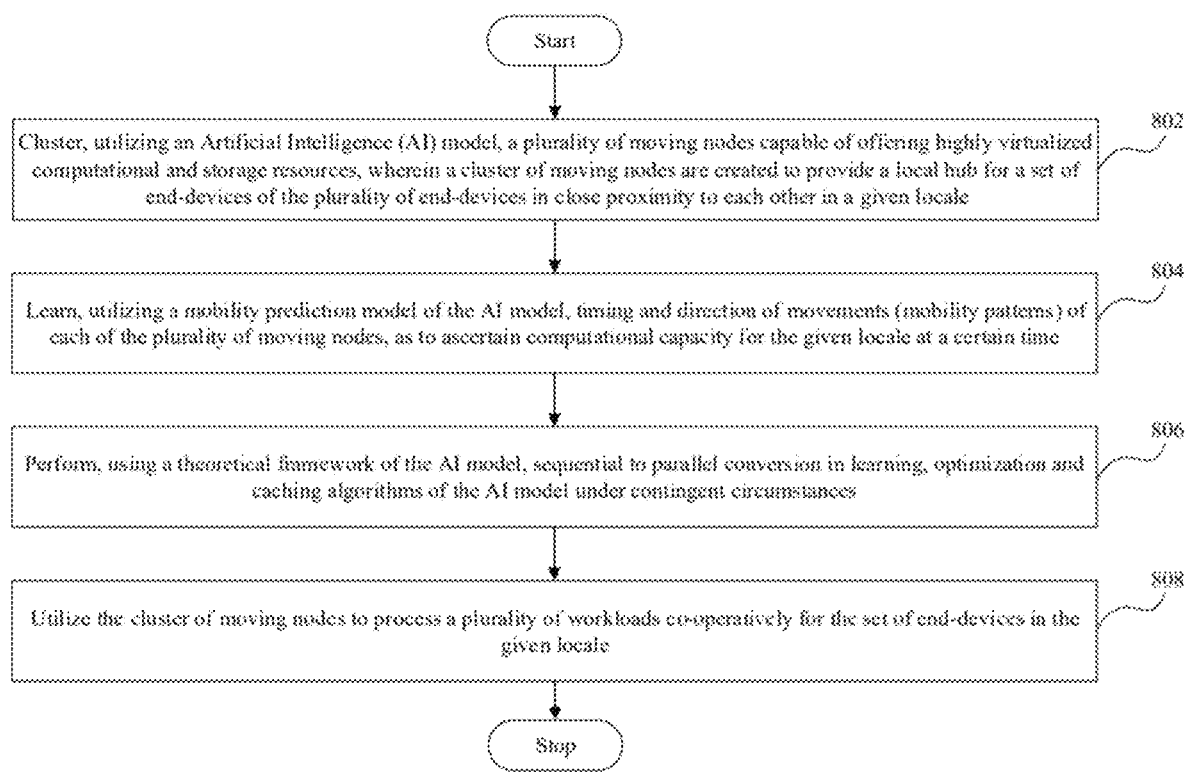
FIG. 8 illustrates a flowchart of a method for distribution of computational capacity for a plurality of end-devices in different localities using a decentralized edge architecture in accordance with an embodiment of the invention.

FIG. 8 illustrates a flow chart of a method for distribution of computational capacity for the plurality of end-devices in different localities using the decentralized edge architecture in accordance with an embodiment of the invention.

As illustrated in FIG. 8, at step 802, clustering module 108 is used to cluster a plurality of moving nodes capable of offering highly virtualized computational and storage resources, utilizing AI model 110. The cluster of moving nodes thus created provides a local hub for a set of end-devices of the plurality of end-devices in close proximity to each other in a given locale.

To perform clustering, AI model 110 includes two prediction models: mobility prediction model 112 and theoretical framework 114. At step 804, mobility prediction model 112 learns timing and direction of movements such as, but not limited to, mobility patterns of each of the plurality of moving nodes as to ascertain computational capacity for the given locale at the certain time.

At step 806, theoretical framework 114 performs sequential to parallel conversion in learning, optimization and caching algorithms of AI model 110 under contingent circumstances for efficient distribution of computing and storage resources among the plurality of moving nodes. In accordance with an embodiment of the invention, clustering module 108 performs clustering of the plurality of moving nodes by employing consensus protocol 116 to ensure consensus among a cluster of moving nodes of the plurality of moving nodes working towards a common goal. Consensus protocol 116 is used to understand capabilities of a variety of moving nodes using different service providers.

Once the plurality of moving nodes are clustered, at step 808, the cluster of moving nodes is utilized to process a plurality of workloads co-operatively for the set of end-devices in the given locale. In the event that one or more moving nodes of the cluster of moving nodes are disabled, the plurality of workloads are redistributed among the other moving nodes in the cluster and the one or more disabled moving nodes are enabled to leave the cluster by restoring system 100 without restarting it. AI model 110 further employs *Byzantine* Fault Tolerance for scenarios where a moving node's data center may fail or move. AI model 110 applies model parallelism by partitioning AI model 110 itself to distribute the plurality of workloads to the other moving nodes.

The present invention is advantageous in that it addresses the following challenges.

(a) Decentralizing computing and storage: The demand for each edge vehicle needs to be anticipated so that adequate vehicle resources are deployed to meet locational demands. For instance, when a single vehicle moves out of the local area, its storage and computing resources need to be distributed across other vehicles that remain in that area and new vehicles that enter the area. The architecture leverages an excessive mobility map in developing predictive algorithms to optimally distribute computing and storage resources among vehicles. In doing this, it is necessary to take into account challenges related to redundancy, security, heterogeneity, and federation that interoperability is ensured on the level of different service providers and mobility handling. OMNIBUS model leverages and combines existing MANET (Mobile Ad-hoc Network), VANET (Vehicular Ad-hoc Network) and DTN (Delay Tolerant Networking) technologies for vehicle-to-vehicle and vehicle-to-device communication. Moreover, this model also looks at how to distribute computing and storage across the entire system, that is, whether data should remain local (shared among vehicles) or be sent to the cloud.

(b) Aggregated Mobility Handling (accurately depicting vehicular behavior): In the mobile edge architecture, developing the mobility prediction model is critical for optimizing the allocation of computing and storage resource sharing among them. These mobility patterns enable us to provide for offloading decisions as well as to control energy consumption and bytes of data transfer. The invention uses databases provided by mobile operators, smart transportation systems, etc., to build the mobility model. Mobility patterns are learned and each vehicle shares mobility patterns and movements of other vehicles via mesh networking technologies. OMNIBUS model uses a combination of DAG-based and Blockchain-based distributed ledger technologies depending on different frequency scenarios for aggregation. The OMNIBUS model seeks to develop communication protocols for vehicles in a highly chaotic environment. To do this, OMNIBUS model leverages MANET, VANET, and DTN technologies.

(c) Heterogeneity issues: Heterogeneity of resources, in terms of computational and storage capabilities as well as their ad-hoc availability, is necessary to optimize. Heterogeneity is important in deciding which application component needs to be deployed and where it should it deployed. This involves developing algorithms to address heterogeneity taking into account the limitations of specific nodes. For instance, in a content delivery use case, storage limitations of the caches are incorporated into the caching algorithm. Furthermore, while node degrees can be optimized, each vehicle's CPU will need to compute multiple items at the same time. Ensuring that CPUs are not overwhelmed will be a key consideration in developing algorithms.

(d) Federation issues: In the architecture, vehicles are geographically distributed on a very wide scale and could be assigned to different service providers. Moreover, the cloud can be operated by a different provider. The architecture is designed in a way that interoperability is ensured on the level of federation of different service providers. This means developing a consensus protocol to understand capabilities of a variety of vehicles using different providers.

(e) Handling mobility of end-users: In the case that end-users physically move, the system should be able to continuously provide them with the same quality of experience, without interrupting the service. Furthermore, in the scenario that several end-users are watching the same video, the algorithm may need to allow for the mobility engine to copy the video to be pushed to the destination point. Similarly, as a vehicle moves in the system, resource displacement takes place with implications on resource management algorithms. In addressing this challenge, studying *byzantine* fault tolerance methods, for scenarios where a vehicle's data center may fail or move, is important and there is imperfect information on whether a component has failed or moved. OMNIBUS solution applies model parallelism partitioning the ML model itself to distribute the workload to multiple computational vehicles. In this architecture, understanding ways to partition the ML model according to heterogeneity, federation, and mobility are constantly investigated.

The OMNIBUS solution has a far-reaching impact in three areas summarized below:

(i) 5G and 6G Ultra-Reliable Low Latency Communication (URLLC): Ultra low-latency, the solution's key objective, is to enable a range of new applications (Smart driving, Smart Grids, AR, and IoT in general), which depend on ultra-reliable and ultra-low latency connectivity. The OMNIBUS solution is driven by the need to remove present and future bottlenecks in communication networks and to prepare the groundwork for future 5G and 6G heterogeneous networks. The solution responds to the market need for a comprehensive edge network platform for faster and more reliable data processing. Attempts to move computing closer to the network (Cloudlets, Fog Computing, MEC) are not scalable.

In contrast, the architecture has the potential to scale almost infinitely and increases the speed of networks while it grows. The solution extends to connected devices, including persons with smart phones and all IoT applications, as computing and storage centers. The decentralized network architecture opens new possibilities for network slicing, hence, lower latency, more storage capacity, more network resilience and security, and less energy waste. By breaking down and distributing computing and storage resources for intermittent networking, the solution leads the way for a scalable collaborative communication network.

(ii) Decentralized Internet: The framework architecture can be used for high latency, delay tolerant Internet access for more than 3.9 billion of the world's population, who remain offline today. A decentralized storage and computational framework is more reliable than current digital infrastructures, which are vulnerable to disaster situations, where a single point of failure in the infrastructure can bring down the entire communication network. The OMNIBUS solution leverages the mobility model to solve the massive routing problems and predictive algorithms to optimally distribute computing and storage among vehicles, to bring Internet data to unconnected regions. In this regard, the OMNIBUS solution is expected to open new directions in research on ad-hoc technologies and DTN-based data mules. As opposed to URLLC, this can be named as UCHLC: Ultra Coverage High Latency Communication.

(iii) Smart transportation: The solution has considerable impact on smart transportation systems, including traffic systems and edge computing in vehicles. It has the potential to redirect research on traffic systems towards a decentralized, learning-based study of complex traffic control problems, involving interactions of humans, automated vehicles, and sensing infrastructure. The resulting control laws and emergent behaviors of vehicles potentially provide insight for the behavior of each vehicle. These insights are replicated, shared, and synchronized among vehicles, over a distributed ledger technology through peer-to-peer ad-hoc networking, to understand the potential for automation of flow. Furthermore, the research can be employed as a new computational framework that integrates open-source deep learning and simulation tools, to support the development of edge computing in vehicles, in the context of complex nonlinear dynamics of transportation.

The present invention is advantageous in decreasing end-to-end latency, bandwidth requirements, and connectivity dependencies, avoiding the transfer of data back and forth between the cloud and individual devices.

The present invention also increases energy efficiency of battery-dependent mobile devices since (i) computation and storage duties are mostly handled by the edge resources, instead of the device itself, and (ii) less communication is performed since transfer of data back and forth between the cloud and individual devices are avoided.

Those skilled in the art will realize that the above recognized advantages and other advantages described herein are merely exemplary and are not meant to be a complete rendering of all of the advantages of the various embodiments of the present invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of the present invention.

What is claimed is:

1. A method for distribution of computational capacity for a plurality of end-devices in different localities using a decentralized edge architecture, the method comprising:
   clustering, utilizing an Artificial Intelligence (AI) model, a plurality of moving nodes capable of offering highly virtualized computational and storage resources, wherein a cluster of moving nodes is created to provide a local hub for a set of end-devices of the plurality of end-devices in close proximity to each other in a given locale, wherein the clustering further comprises:
      learning, utilizing a mobility prediction model of the AI model, timing and direction of movements (mobility patterns) of each of the plurality of moving nodes, as to ascertain computational capacity for the given locale at a certain time; and
      performing, using a theoretical framework of the AI model, sequential to parallel conversion in learning, optimization and caching algorithms of the AI model under contingent circumstances; and
   utilizing the cluster of moving nodes to process a plurality of workloads co-operatively for the set of end-devices in the given locale.

2. The method of claim 1, wherein the plurality of moving nodes comprise at least one of moving vehicles, pedestrians carrying wireless and/or cellular communication devices (such as, but not limited to, Wi-Fi, LTE, 5G, 6G) and drones.

3. The method of claim 1 comprises distributing storage systems to enable faster I/O and non-blocking data processing procedures for a plurality of different environments, the plurality of different environments comprising at least one of a single node local disk and distributed file systems.

4. The method of claim 1, wherein the clustering further comprises employing a consensus protocol to ensure consensus among a cluster of moving nodes of the plurality of moving nodes working towards a common goal, wherein the consensus protocol is used to understand capabilities of a variety of moving nodes using different service providers.

5. The method of claim 1, wherein the AI model employs distributed Machine Learning (ML) and model parallelism to speed up large-scale ML by reducing training time, by means of parallel or distributed computing, wherein the AI model employs simple programming models that allow for distributed processing of large datasets across clusters of computers by building parallel systems harnessing thousands of simple and efficient computing and storage resources.

6. The method of claim 1, wherein the AI model employs a next generation distributed Directed Acyclic Graph (DAG)-based ledger technology for high frequency transactions to create a peer-to-peer network protocol wherein, to ensure a continuous system, high frequency and low frequency transactions are optimized by harmonizing DAG-based ledger technology and Blockchain-based ledger technology.

7. The method of claim 6, wherein the AI model performs Aggregated Mobility Handling (AMH) by charting out mobility patterns of the plurality of moving nodes, in order to optimize computing and storage distribution among the plurality of moving nodes, wherein the AMH is performed over a combination of the DAG-based ledger technology and the Blockchain-based ledger technology, depending on different frequency scenarios.

8. The method of claim 7, wherein the AI model utilizes a convex optimization method which predicts flow/movement of the plurality of moving nodes to represent coordination of the plurality of moving nodes, wherein the convex optimization method relies on accurate traffic flow sensing.

9. The method of claim 8, wherein the AI model utilizes generic reinforcement learning techniques for improved dimension reduction and applies ML and optimization methods to mixed autonomy systems.

10. The method of claim 1, wherein the AI model further performs real-time independent decision-making by utilizing a sequential decision-making tool/program, to model the learning and decision-making processes of users, passengers and/or drivers of the plurality of moving nodes.

11. The method of claim 1, wherein the AI model utilizes a decentralized, learning-based solution using deep reinforcement learning, to analyze interactions between humans, the plurality of moving nodes and a sensing infrastructure, to provide insights related to behavior of each moving node of the plurality of moving nodes, wherein the insights are replicated, shared, and synchronized among the plurality of moving nodes, over a distributed ledger technology, through peer-to-peer ad-hoc networking.

12. The method of claim 11 further comprises leveraging and combining mesh networking systems for performing node-to-node and node-to-device communication and creating and employing a global mobility map to understand mobility patterns of the plurality of moving nodes.

13. The method of claim 1, wherein the utilizing further comprises, in an event that at least one moving node of the cluster of moving nodes is disabled, redistributing the plurality of workloads among the other moving nodes in the cluster and enabling the at least one moving node to leave the cluster by restoring a system without restarting it.

14. The method of claim 13, wherein the AI model employs *Byzantine* Fault Tolerance for scenarios where a moving node's data center may fail or move, wherein the AI model applies model parallelism by partitioning an ML model itself to distribute the plurality of workloads to the other moving nodes.

15. The method of claim 1, wherein the decentralized edge architecture is further integrated with at least one of edge-centric Mobile Edge computing (MEC), FOG computing, Augmented Reality (AR)-cloud, Drone-edge computing, and a long-range Wi-Fi ad-hoc network.

16. The method of claim 15, wherein the AR-cloud comprises a digital content layer mapped to objects and locations in a real physical world to enable an ubiquitous, scalable, spatial user experience, wherein the AR-cloud creates a digital copy (Digital Twin) of the real physical world and associates information added to the digital copy with relevant physical spaces and objects in the real physical world.

17. The method of claim 15, wherein the Drone-edge computing enables unmanned aerial vehicles to serve as additional distributed storage and computation resources, along with pedestrians and a plurality of moving vehicles, thereby supporting the distribution of computational capacity for the plurality of end-devices in different localities.

18. The method of claim 15, wherein the long-range Wi-Fi ad-hoc network is integrated with unidirectional antennas, satellite antennas or a ground station, wherein the Wi-Fi ad-hoc network acts as a backbone ad-hoc network that can connect different local regions without Internet.

19. The method of claim 1 further comprises defining missing intermediate moving nodes and providing placement suggestions/recommendations to position the plurality of moving nodes at specific locations to ensure connectivity of new edges/paths due to the missing intermediate moving nodes.

20. A system for distribution of computational capacity for a plurality of end-devices in different localities using a decentralized edge architecture, the system comprising:
 a memory;
 a processor communicatively coupled to the memory, the processor configured to:
  cluster, utilizing an Artificial Intelligence (AI) model, a plurality of moving nodes capable of offering highly virtualized computational and storage resources, wherein a cluster of moving nodes is created to provide a local hub for a set of end-devices of the plurality of end-devices in close proximity to each other in a given locale, wherein the processor is further configured to:
   learn, utilizing a mobility prediction model of the AI model, timing and direction of movements (mobility patterns) of each of the plurality of moving nodes, as to ascertain computational capacity for the given locale at a certain time; and
   perform, using a theoretical framework of the AI model, sequential to parallel conversion in learning, optimization and caching algorithms of the AI model under contingent circumstances; and
  utilize the cluster of moving nodes to process a plurality of workloads co-operatively for the set of end-devices in the given locale.

21. The system of claim 20, wherein the plurality of moving nodes comprise at least one of moving vehicles, pedestrians carrying wireless and/or cellular communication devices (such as, but not limited to, Wi-Fi, LTE, 5G, 6G) and drones.

22. The system of claim 20, wherein the processor is configured to distribute storage systems to enable faster I/O and non-blocking data processing procedures for a plurality of different environments, the plurality of different environments comprising at least one of a single node local disk and distributed file systems.

23. The system of claim 20, wherein the processor is configured to employ a consensus protocol to ensure consensus among a cluster of moving nodes of the plurality of moving nodes working towards a common goal, wherein the consensus protocol is used to understand capabilities of a variety of moving nodes using different service providers.

24. The system of claim 20, wherein the AI model employs distributed Machine Learning (ML) and model parallelism to speed up large-scale ML by reducing training time, by means of parallel or distributed computing, wherein the AI model employs simple programming models that allow for distributed processing of large datasets across clusters of computers by building parallel systems harnessing thousands of simple and efficient computing and storage resources.

25. The system of claim 20, wherein the AI model employs a next generation distributed Directed Acyclic Graph (DAG)-based ledger technology for high frequency transactions to create a peer-to-peer network protocol wherein, to ensure a continuous system, high frequency and low frequency transactions are optimized by harmonizing DAG-based ledger technology and Blockchain-based ledger technology.

26. The system of claim 25, wherein the AI model performs Aggregated Mobility Handling (AMH) by charting out mobility patterns of the plurality of moving nodes, in order to optimize computing and storage distribution among the plurality of moving nodes, wherein the AMH is performed over a combination of the DAG-based ledger technology and the Blockchain-based ledger technology, depending on different frequency scenarios.

27. The system of claim 26, wherein the AI model utilizes a convex optimization method which predicts flow/movement of the plurality of moving nodes to represent coordination of the plurality of moving nodes, wherein the convex optimization method relies on accurate traffic flow sensing.

28. The system of claim 27, wherein the AI model utilizes generic reinforcement learning techniques for improved dimension reduction and applies ML and optimization methods to mixed autonomy systems.

29. The system of claim 20, wherein the AI model further performs real-time independent decision-making by utilizing a sequential decision-making tool/program, to model the learning and decision-making processes of users, passengers and/or drivers of the plurality of moving nodes.

30. The system of claim 20, wherein the AI model utilizes a decentralized, learning-based solution using deep reinforcement learning, to analyze interactions between humans, the plurality of moving nodes and a sensing infrastructure, to provide insights related to behavior of each moving node of the plurality of moving nodes, wherein the insights are replicated, shared, and synchronized among the plurality of moving nodes, over a distributed ledger technology, through peer-to-peer ad-hoc networking.

31. The system of claim 30, wherein the processor is further configured to leverage and combine mesh networking systems for performing node-to-node and node-to-device communication and create and employ a global mobility map to understand mobility patterns of the plurality of moving nodes.

32. The system of claim 20, wherein in an event that at least one moving node of the cluster of moving nodes is disabled, the processor is further configured to redistribute the plurality of workloads among the other moving nodes in the cluster and enable the at least one moving node to leave the cluster by restoring the system without restarting it.

33. The system of claim 32, wherein the AI model employs *Byzantine* Fault Tolerance for scenarios where a moving node's data center may fail or move, wherein the AI model applies model parallelism by partitioning an ML model itself to distribute the plurality of workloads to the other moving nodes.

34. The system of claim 20, wherein the decentralized edge architecture is further integrated with at least one of edge-centric Mobile Edge computing (MEC), FOG computing, Augmented Reality (AR)-cloud, Drone-edge computing, and a long-range Wi-Fi ad-hoc network.

35. The system of claim 34, wherein the AR-cloud comprises a digital content layer mapped to objects and locations in a real physical world to enable an ubiquitous, scalable, spatial user experience, wherein the AR-cloud creates a digital copy (Digital Twin) of the real physical world and associates information added to the digital copy with relevant physical spaces and objects in the real physical world.

36. The system of claim 34, wherein the Drone-edge computing enables unmanned aerial vehicles to serve as additional distributed storage and computation resources, along with pedestrians and a plurality of moving vehicles, thereby supporting the distribution of computational capacity for the plurality of end-devices in different localities.

37. The system of claim 34, wherein the long-range Wi-Fi ad-hoc network is integrated with unidirectional antennas, satellite antennas or a ground station, wherein the Wi-Fi ad-hoc network acts as a backbone ad-hoc network that can connect different local regions without Internet.

38. The system of claim 20, wherein the processor is further configured to define missing intermediate moving nodes and provide placement suggestions/recommendations to position the plurality of moving nodes at specific locations to ensure connectivity of new edges/paths due to the missing intermediate moving nodes.

\* \* \* \* \*